(12) United States Patent
Liu et al.

(10) Patent No.: US 10,865,161 B2
(45) Date of Patent: Dec. 15, 2020

(54) WATER-ABSORBING AND WATER-RETAINING MULTI-NUTRIENT BIODEGRADABLE POLYMERIC SLOW/CONTROLLED RELEASE FERTILIZER HAVING A SEMI-INTERPENETRATING NETWORK STRUCTURE

(71) Applicant: NORTH UNIVERSITY OF CHINA, Shanxi (CN)

(72) Inventors: Yaqing Liu, Taiyuan (CN); Yang Xiang, Taiyuan (CN); Guizhe Zhao, Taiyuan (CN)

(73) Assignee: NORTH UNIVERSITY OF CHINA, Taiyuan (CN)

( * ) Notice: Subject to any disclaimer, the term of this patent is extended or adjusted under 35 U.S.C. 154(b) by 251 days.

(21) Appl. No.: 15/910,887

(22) Filed: Mar. 2, 2018

(65) Prior Publication Data
US 2019/0031574 A1    Jan. 31, 2019

(30) Foreign Application Priority Data

Jul. 31, 2017  (CN) .......................... 2017 1 0639591
Jul. 31, 2017  (CN) .......................... 2017 1 0639593
Jul. 31, 2017  (CN) .......................... 2017 1 0644325

(51) Int. Cl.
*C05G 5/40*      (2020.01)
*C09K 17/22*    (2006.01)
(Continued)

(52) U.S. Cl.
CPC ................. *C05G 5/40* (2020.02); *C05B 7/00* (2013.01); *C05B 17/00* (2013.01); *C05B 19/00* (2013.01);
(Continued)

(58) Field of Classification Search
None
See application file for complete search history.

(56) References Cited

U.S. PATENT DOCUMENTS 5,120,344 A * 6/1992 Libor .................. C05G 3/0047
                                                              106/900
5,209,768 A * 5/1993 Hughes ............... C05G 3/0047
                                                              504/313
(Continued)

*Primary Examiner* — Wayne A Langel
(74) *Attorney, Agent, or Firm* — Christensen O'Connor Johnson Kindness PLLC

(57) ABSTRACT

This disclosure relates to water-absorbing and slow/controlled release fertilizer, in particular to a water-absorbing and water-retaining multi-nutrient biodegradable polymeric slow/controlled release fertilizer having a semi-interpenetrating network structure, and preparation methods thereof. The method can comprises the steps of: reacting formaldehyde with urea to obtain a hydroxymethyl urea solution; adding acrylic acid and acrylamide monomers into another reactor, and adding a KOH solution to adjust the neutralization degree of acrylic acid, then adding one of inorganic clay, pretreated crop straw or cellulose, then adding initiator, monopotassium phosphate and the prepared hydroxymethyl urea solution sequentially; allowing to react at temperature after being mixed uniformly to obtain a viscous product; and granulating the viscous product and oven drying the same to obtain the fertilizer. The fertilizer prepared according to the present invention has strong water-absorbing and water-retaining capacity, and an excellent slow release performance for nitrogen, phosphorus and potassium contained as nutrients.

11 Claims, 6 Drawing Sheets

(51) Int. Cl.
*C09K 17/28* (2006.01)
*C05G 3/40* (2020.01)
*C05G 3/80* (2020.01)
*C05B 7/00* (2006.01)
*C08F 292/00* (2006.01)
*C05B 19/00* (2006.01)
*C08F 251/02* (2006.01)
*C05B 17/00* (2006.01)

(52) U.S. Cl.
CPC ............... *C05G 3/40* (2020.02); *C05G 3/80* (2020.02); *C08F 251/02* (2013.01); *C08F 292/00* (2013.01); *C09K 17/22* (2013.01); *C09K 17/28* (2013.01); *C08L 2201/06* (2013.01)

(56) References Cited

U.S. PATENT DOCUMENTS

| | | | |
|---|---|---|---|
| 2002/0049291 A1* | 4/2002 | Sanders | C05D 9/02 526/271 |
| 2003/0154754 A1* | 8/2003 | Costa | C05C 9/02 71/28 |
| 2004/0011102 A1* | 1/2004 | Sears | C05F 11/00 71/25 |
| 2006/0003893 A1* | 1/2006 | Pursell | A01N 25/08 504/116.1 |
| 2006/0260372 A1* | 11/2006 | Liu | C05C 9/02 71/64.11 |
| 2007/0015878 A1* | 1/2007 | Savich | C05G 5/40 525/242 |
| 2007/0039365 A1* | 2/2007 | King | C05C 9/00 71/28 |
| 2007/0167327 A1* | 7/2007 | Savich | A01N 25/34 504/101 |
| 2009/0019905 A1* | 1/2009 | Savich | C05G 3/80 71/27 |
| 2011/0319501 A1* | 12/2011 | Sternini | C05G 3/0047 514/772.6 |
| 2017/0008818 A1* | 1/2017 | Hermitte | A01G 22/00 |

\* cited by examiner

WATER-ABSORBING AND WATER-RETAINING MULTI-NUTRIENT BIODEGRADABLE POLYMERIC SLOW/CONTROLLED RELEASE FERTILIZER HAVING A SEMI-INTERPENETRATING NETWORK STRUCTURE

CROSS-REFERENCES TO RELATED APPLICATIONS

This application claims the benefit of Chinese Application No. 201710639593.X, filed Jul. 31, 2017, Chinese Application No. 201710644325.7, filed Jul. 31, 2017, and Chinese Application No. 201710639591.0, filed Jul. 31, 2017, the disclosures of which are hereby incorporated herein by reference in their entireties.

TECHNICAL FIELD

The present invention relates to the field of water-absorbing and water-retaining slow/controlled release fertilizer, in particular to a water-absorbing and water-retaining multi-nutrient biodegradable polymeric slow/controlled release fertilizer having a semi-interpenetrating network structure, and a preparation method thereof.

BACKGROUND

Currently, slow/controlled release fertilizers are mainly coated fertilizers, the structures of which are mostly a shell-core structure, with an instant composite fertilizer as core, and a semi-permeable or impermeable film material as shell. There exist disadvantages of complex coating process and high cost of film materials, etc., limiting the promotion and application of release fertilizers. Especially with the increasing environmental awareness, people gradually realize that these nondegradable coating materials remaining in the soil will cause environmental pollution.

Polyacrylic organic superabsorbent resin has excellent water-absorbing and water-retaining property as a three-dimensional network material, and has found a wide application in the field of agriculture. However, there still exist some problems such as being expensive and having poor salt tolerance now. By introducing inorganic clay, crop straw or cellulose into the current polyacrylic organic superabsorbent resin to form a novel composite water-absorbing and water-retaining material, not only the salt tolerance of the superabsorbent resin can be improved, but also the added values of inorganic clay, crop straw and cellulose can be improved. In addition, preparing a multi-functional slow/controlled release fertilizer by means of compounding the water-absorbing and water-retaining materials with fertilizer nutrients is not only environmentally friendly, but also can effectively reduce the cost of slow/controlled release fertilizer.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention aims to provide a multi-nutrient biodegradable polymeric slow/controlled release fertilizer with a water-absorbing and water-retaining function, comprising: a high polymer having a semi-interpenetrating network structure, said semi-interpenetrating network structure of the high polymer being such that a polymeric slow/controlled release fertilizer (PRF) molecular chain is interposed in a composite water-absorbing resin network;

wherein said composite water-absorbing resin is of a three-dimensional spatial network structure formed by respective graft copolymerization of acrylic acid and acrylamide with inorganic clay, crop straw or cellulose under the action of an initiator and a crosslinking agent;

the water-absorbing and water-retaining multi-nutrient biodegradable polymeric slow/controlled release fertilizer having a semi-interpenetrating network structure further comprises a polymeric slow/controlled release fertilizer (PRF) that separates itself from the composite water-absorbing resin three-dimensional spatial network structure and aggregates into a monophasic structure.

Furthermore, the water-absorbing and water-retaining multi-nutrient biodegradable polymeric slow/controlled release fertilizer having a semi-interpenetrating network structure further comprises inorganic clay, crop straw or cellulose that separates itself from the composite water-absorbing resin three-dimensional spatial network structure and is not involved in graft copolymerization. The structural schematic representations are shown in FIG. 8, FIG. 9 and FIG. 10 respectively.

In order to illustrate the water-absorbing and water-retaining multi-nutrient biodegradable polymeric slow/controlled release fertilizer having a semi-interpenetrating network structure of the present invention more clearly, the present invention also provides a method for preparing the water-absorbing and water-retaining multi-nutrient biodegradable polymeric slow/controlled release fertilizer having a semi-interpenetrating network structure, comprising the steps of:

(1) adding formaldehyde and urea respectively into a first reactor, adjusting the resultant system to pH=8 with a 5% KOH solution, and reacting the same at 40° C. for 2 h to obtain a hydroxymethyl urea solution;

(2) adding acrylic acid and acrylamide into a second reactor, and adding a 20 mass % KOH solution to adjust the neutralization degree of acrylic acid monomer to 20%-100%; adding one of inorganic clay, pretreated crop straw or cellulose; and then adding monopotassium phosphate, an initiator and the hydroxymethyl urea solution prepared in step (1) sequentially, mixing them under an ice bath for 30 min, warming the resultant mixture to 55° C. and then reacting the same under an atmosphere of nitrogen for 4 h to obtain a viscous product;

(3) granulating the obtained viscous product and oven drying the same to obtain a water-absorbing and water-retaining multi-nutrient biodegradable polymeric slow/controlled release fertilizer having a semi-interpenetrating network structure.

The present invention further provides a reaction mechanism for the above-mentioned water-absorbing and water-retaining multi-nutrient biodegradable polymeric slow/controlled release fertilizer having a semi-interpenetrating network structure as illustrated in FIG. 11.

In the above-mentioned reaction mechanism, AM refers to acrylamide, MBA refers to N,N-methylene bisacrylamide, APS refers to an initiator, clay refers to an inorganic clay, straw refers to cellulose crystals in straw, cellulose refers to cellulose, and AA refers to acrylic acid; wherein the inorganic clay, pretreated crop straw or cellulose forms a monomer with an oxygen radical under the action of an initiator, and then forms a composite water-absorbing resin under the action of AA, AM and MBA. In the structure of a composite water-absorbing resin, inorganic clay, pretreated crop straw or cellulose functions in the graft crosslinking of copolymer.

Preferably, the molar ratio of formaldehyde to urea in step (1) is 1:1.2-2.

Preferably, the mass ratio of acrylic acid to acrylamide to inorganic clay, pretreated crop straw or cellulose in step (2) is (2-10):1:(0.2-1).

More preferably, in step (2), the monopotassium phosphate, the initiator and the hydroxymethyl urea solution described are added in an amount of 0-10%, 0.1%-1% and 0-100% of the total mass of acrylic acid and acrylamide respectively, and the addition amount of neither monopotassium phosphate nor hydroxymethyl urea solution is 0. Of course, those skilled in the art can also prepare a water-absorbing and water-retaining biodegradable polymeric slow/controlled release fertilizer having a semi-interpenetrating network structure with different nitrogen, phosphorus and potassium contents according to different requirements, by controlling the addition amounts (including the addition amount ranges mentioned in the present invention, and those unmentioned in the present invention) of urea, formaldehyde, monopotassium phosphate and inorganic clay (or pretreated crop straw or cellulose) as reactive materials. However, according to the addition amounts and the mass ratios provided by the present invention, in the water-absorbing and water-retaining multi-nutrient biodegradable polymeric slow/controlled release fertilizer having a semi-interpenetrating network structure, the contents of nitrogen, phosphorus and potassium obtained by the combination of theoretical and actual measurement are recorded by mass percentage as: the content of nitrogen is 15 wt % to 36 wt %, the content of phosphorus is 0 wt % to 8 wt % in terms of $P_2O_5$, the content of potassium is 0 wt % to 22 wt % in terms of $K_2O$; and the water absorbency in tap water is 26 to 134 g/g.

Specifically, said inorganic clay is any one of attapulgite, kaolin, diatomite, mica, bentonite, hydrotalcite, stilbite, illite and rectorite.

Specifically, said crop straw is any one of wheat straw, rice straw, maize straw and sorghum straw.

Specifically, the pretreatment of said crop straw comprises the steps of: weighing an amount of crop straw powder, immersing it in distilled water, soaking it at 60° C. for 12 h and then filtering the resultant to obtain a filter cake, placing the filter cake into a solution consisting of 24% KOH and 1% $NaBH_4$, stirring the same for 3 h and then filtering the resultant to obtain a second filter cake, then washing the second filter cake with distilled water repeatedly until the filtrate is neutral, and oven drying the resultant filter cake for use.

Specifically, said cellulose is any one of carboxymethyl cellulose, hydroxyethyl cellulose and cellulose xanthogenate.

In specific application, said initiator is any one of hydrogen peroxide, potassium persulfate, sodium persulfate, ammonium persulfate, ceric nitrate, a mixture of hydrogen peroxide and ferrous sulfate, a mixture of persulfate and sodium bisulfite, a mixture of persulfate and sodium sulfite, and L-ascorbic acid.

Compared with the existing fertilizer, the present invention has the following advantages:

(1) High water-retaining polymeric slow/controlled release fertilizer having semi-interpenetrating network structure can be obtained by utilizing conventional free radical polymerization in aqueous solution, avoiding the coating process at the later stage of preparation of coated fertilizers, and the preparation process is simple and effective.

(2) The inorganic clay, crop straw and cellulose in the water-absorbing and water-retaining multi-nutrient biodegradable polymeric slow/controlled release fertilizer prepared by the present invention can be obtained from a wide range of sources, and the water-absorbing and water-retaining multi-nutrient biodegradable polymeric slow/controlled release fertilizer prepared by compounding the inorganic clay, crop straw or cellulose mentioned above with superabsorbent resin has the advantages of excellent performance and low cost.

(3) When the water-absorbing and water-retaining multi-nutrient biodegradable polymeric slow/controlled release fertilizer is prepared by using inorganic clay or crop straw as raw materials in the present invention, the clay material and crop straw contain medium and trace element necessary for the growth of plants, such as Fe, Si, Mg, Zn, Mn, etc., and can provide more comprehensive nutrients for crops.

(4) When the water-absorbing and water-retaining multi-nutrient biodegradable polymeric slow/controlled release fertilizer is prepared by using crop straw as raw materials in the present invention, it provides a new way for resource utilization of crop straw; and meanwhile, a large amount of organic matter contained in crop straw can effectively improve physical and chemical properties of soil.

(5) When the water-absorbing and water-retaining multi-nutrient biodegradable polymeric slow/controlled release fertilizer is prepared by using cellulose as raw materials in the present invention, since cellulose has strong hydrophilicity, after being compounded with the superabsorbent resin, can improve the added value of cellulose on the one hand, and can improve the performance of superabsorbent resin on the other hand.

(6) Said water-absorbing and water-retaining multi-nutrient biodegradable polymeric slow/controlled release fertilizer having a semi-interpenetrating network structure, after being applied into the soil, is gradually hydrolyzed and degraded into small nutrient molecules under the action of water and soil microorganisms, reducing the fixation of nutrients by the soil, and the degradation products contain no harmful substances, being green and environmental friendly.

(7) The water-absorbing and water-retaining multi-nutrient biodegradable polymeric slow/controlled release fertilizer having a semi-interpenetrating network structure prepared by the present invention contains the nutrients necessary for the growth of plants, such as nitrogen, phosphorus, potassium, etc., which can improve crop yield and improve crop quality.

(8) The water-absorbing and water-retaining multi-nutrient biodegradable polymeric slow/controlled release fertilizer having a semi-interpenetrating network structure, after being applied into the soil, can effectively improve the water-absorbing and water-retaining capacity of the soil.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
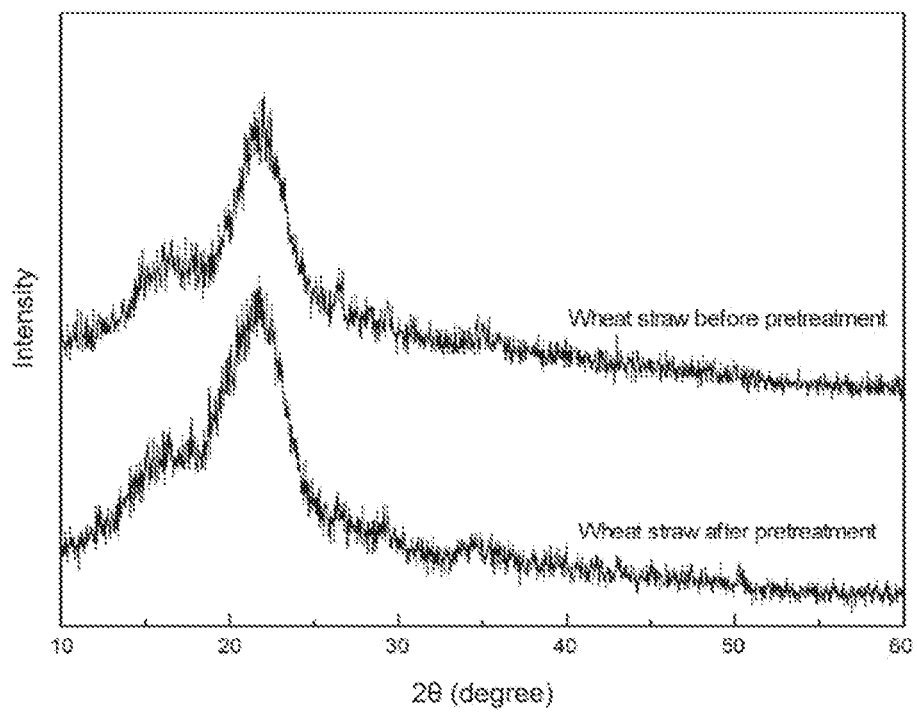
FIG. 1 shows the XRD patterns of wheat straw before and after pretreatment. The two spectral lines in the figure each have a main peak at a diffraction angle of 22 degrees, which represents highly ordered cellulose crystals in the wheat straw structure, indicating that the cellulose structure of the pretreated wheat straw has not been destroyed and that the pretreatment process removes the hemicellulose and other impurities attached to the surface of the wheat straw fiber, with the degree of order of the crystalline structure of cellulose being increased, and the main peak being obviously enhanced.
Figure 2:
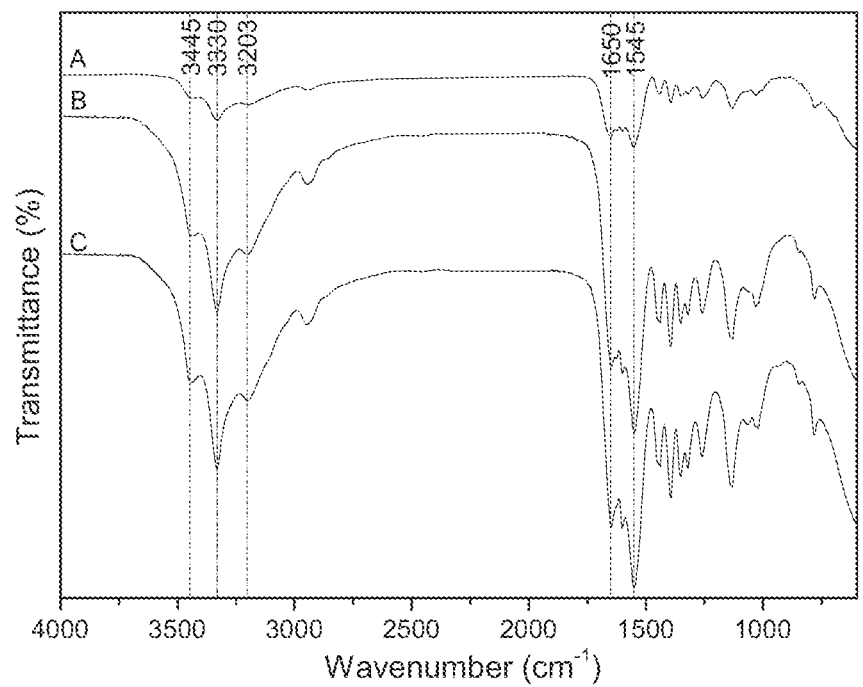
FIG. 2 shows the infrared spectrograms of water-absorbing and water-retaining multi-nutrient biodegradable polymeric slow/controlled release fertilizers having a semi-interpenetrating network structure. In the figure, A is an inorganic clay-based water-absorbing and water-retaining multi-nutrient biodegradable polymeric slow/controlled release fertilizer prepared in Example 3; B is a crop straw-based water-absorbing and water-retaining multi-nutrient biodegradable polymeric slow/controlled release fertilizer prepared in Example 10; and C is a cellulose-based water-absorbing and water-retaining multi-nutrient biodegradable polymeric slow/controlled release fertilizer prepared in Example 17. The stretching vibration absorption peak of the secondary amide in the polymeric slow/controlled release fertilizer (PRF) molecule is at 3330 $cm^{-1}$, the stretching vibration absorption peaks of the primary amide in the polyacrylamide pendant group are at 3445 $cm^{-1}$ and 3203 $cm^{-1}$, the stretching vibration absorption peak of the carbonyl group in the polyacrylamide pendant group is at 1650 $cm^{-1}$, and the asymmetric stretching vibration absorption peak of carboxylate ion in the polyacrylic acid pendant group is at 1545 $cm^{-1}$. The infrared spectrograms indicate that the product has the mentioned structure.
Figure 3:
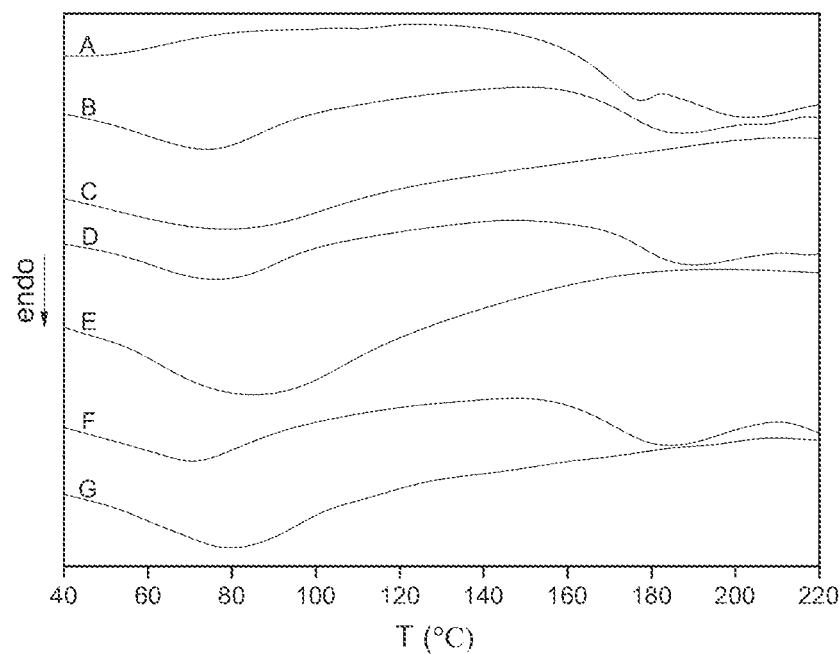
FIG. 3 shows the DSC thermograms of water-absorbing and water-retaining multi-nutrient biodegradable polymeric slow/controlled release fertilizers having a semi-interpenetrating network structure. In the figure, A is an polymeric slow/controlled release fertilizer (PRF) (prepared by the method for preparing a PRF in Example 3, i.e. no water-absorbing resin is added); B is an inorganic clay-based water-absorbing and water-retaining multi-nutrient biodegradable polymeric slow/controlled release fertilizer prepared in Example 3; C is an inorganic clay-based water-absorbing resin (prepared by the method for preparing an inorganic clay-based water-absorbing resin in Example 3, i.e., no polymeric slow/controlled release fertilizer (PRF) is added); D is a crop straw-based water-absorbing and water-retaining multi-nutrient biodegradable polymeric slow/controlled release fertilizer prepared in Example 10; E is a crop straw-based water-absorbing resin (prepared by the method for preparing a crop straw-based water-absorbing resin in Example 10, i.e., no polymeric slow/controlled release fertilizer (PRF) is added); F is a cellulose-based water-absorbing and water-retaining multi-nutrient biodegradable polymeric slow/controlled release fertilizer prepared in Example 17; and G is a cellulose-based water-absorbing resin (prepared by the method for preparing a cellulose-based water-absorbing resin in Example 17, i.e., no polymeric slow/controlled release fertilizer (PRF) is added). As can be seen from the figure, the glass transition temperature ($T_g$) of a water-absorbing resin solely based on inorganic clay (curve C) is 83.6° C.; after the polymeric slow/controlled release fertilizer (PRF) is added to the inorganic clay-based water-absorbing resin (curve B), since the molecular chain of the polymeric slow/controlled release fertilizer (PRF) is interposed in water-absorbing resin network and has a certain plasticizing effect on the water-absorbing resin network, the glass transition temperature of the water-absorbing resin is reduced to 76.6° C.; and in addition to the fact that a part of the polymeric slow/controlled release fertilizer (PRF) molecular chain is interposed in water-absorbing resin network, another part of the polymeric slow/controlled release fertilizer (PRF) molecular chains separate themselves from water-absorbing resin network and aggregate into monophasic structures, and an obvious endothermic decomposition peak of polymeric slow/controlled release fertilizer (PRF) appears at 185.0° C. Likewise, similar conclusions can be obtained in the case of crop straw-based water-absorbing and water-retaining multi-nutrient biodegradable polymeric slow/controlled release fertilizer and cellulose-based water-absorbing and water-retaining multi-nutrient biodegradable polymeric slow/controlled release fertilizer. The above analysis shows that the product has the mentioned semi-interpenetrating network structure.
Figure 4:
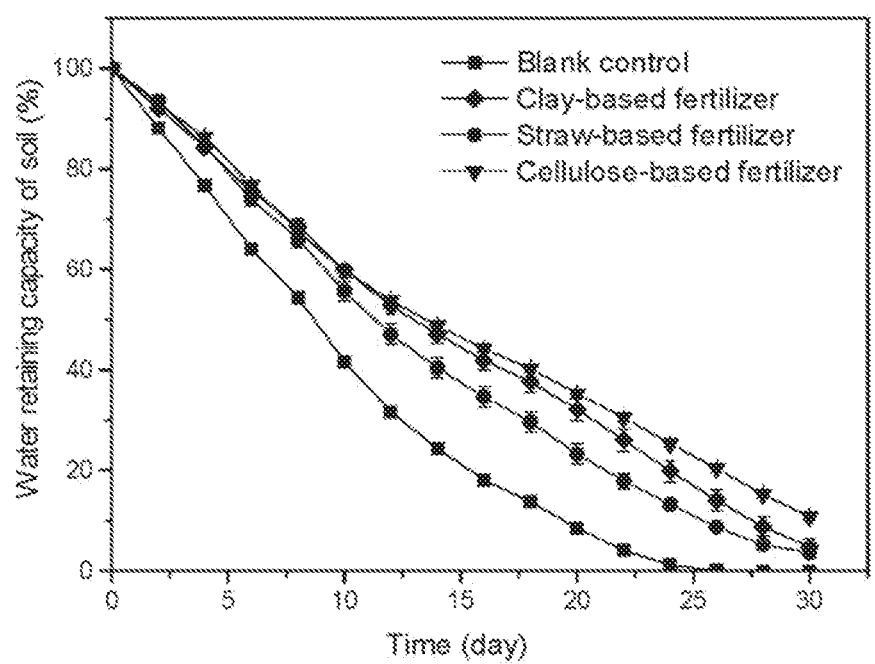
FIG. 4 shows the water retaining capacity curves of water-absorbing and water-retaining multi-nutrient biodegradable polymeric slow/controlled release fertilizers having a semi-interpenetrating network structure. At Day 16 and 26, the water retention rates of the blank soil sample were 18.1% and 0%, respectively. However, the water retention rates of soil sample with 2% inorganic clay-based water-absorbing and water-retaining multi-nutrient biodegradable polymeric slow/controlled release fertilizer added increased to 41.9% and 14.1%, respectively; the water retention rates of soil sample with 2% crop straw-based water-absorbing and water-retaining multi-nutrient biodegradable polymeric slow/controlled release fertilizer added increased to 34.7% and 8.8%, respectively; and the water retention rates of soil sample with 2% cellulose-based water-absorbing and water-retaining multi-nutrient biodegradable polymeric slow/controlled release fertilizer added increased to 44.2% and 20.4%, respectively. It indicates that the application of water-absorbing and water-retaining multi-nutrient biodegradable polymeric slow/controlled release fertilizers having a semi-interpenetrating network structure can effectively improve the water retaining capacity of soil.
Figure 5:
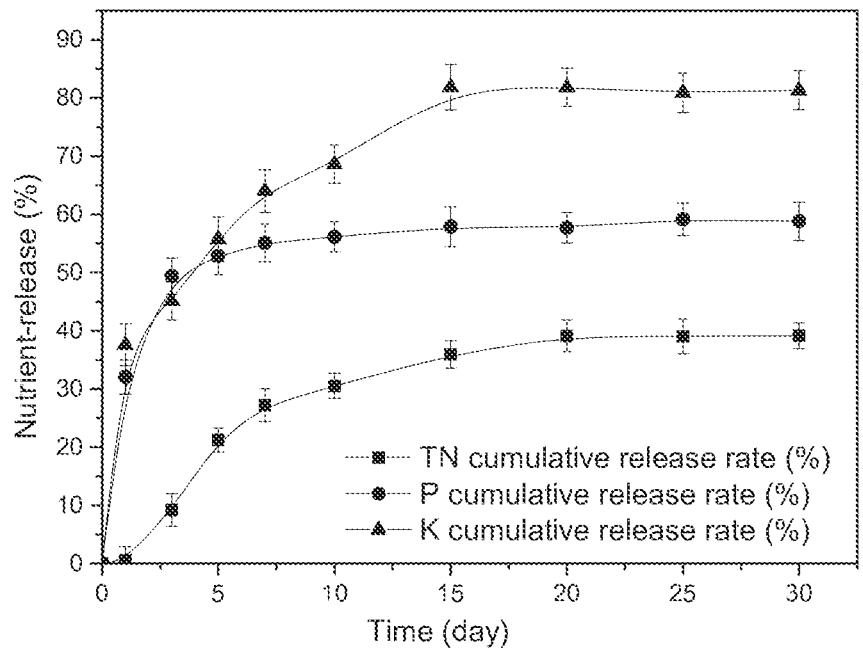
FIG. 5 shows the release curves of nitrogen, phosphorus and potassium as nutrients of water-absorbing and water-retaining multi-nutrient biodegradable polymeric slow/controlled release fertilizers having a semi-interpenetrating network structure prepared in Example 3. In the figure, the release of each nutrient all exhibits a trend of rapidly increasing at an early stage and gradually becoming gentle at a later stage. At Day 30, the accumulative release rates of nitrogen, phosphorus and potassium were 39.2%, 58.8% and 81.3%, respectively. It can be seen that the inorganic clay-based water-absorbing and water-retaining multi-nutrient biodegradable polymeric slow/controlled release fertilizer having a semi-interpenetrating network structure has an excellent action in terms of slow/controlled release of nitrogen, phosphorus and potassium as nutrients.
Figure 6:
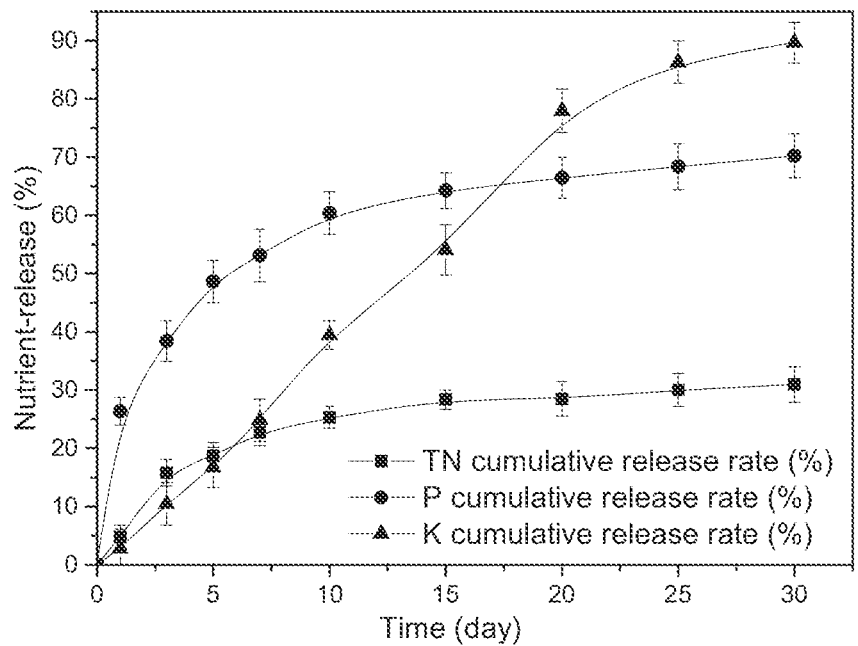
FIG. 6 shows the release curves of nitrogen, phosphorus and potassium as nutrients of water-absorbing and water-retaining multi-nutrient biodegradable polymeric slow/controlled release fertilizer having a semi-interpenetrating network structure prepared in Example 10. In the figure, the release of nitrogen and phosphorus as nutrients exhibit a trend of rapidly increasing at an early stage and gradually becoming gentle at a later stage, and the release of potassium as a nutrient exhibit a trend of smoothly increasing at an early stage and gradually becoming gentle at a later stage. At Day 30, the accumulative release rates of nitrogen, phosphorus and potassium were 30.9%, 70.2% and 89.6%, respectively. It can be seen that the crop straw-based water-absorbing and water-retaining multi-nutrient biodegradable polymeric slow/controlled release fertilizer having a semi-interpenetrating network structure has an excellent action in terms of slow/controlled release of nitrogen, phosphorus and potassium as nutrients.
Figure 7:
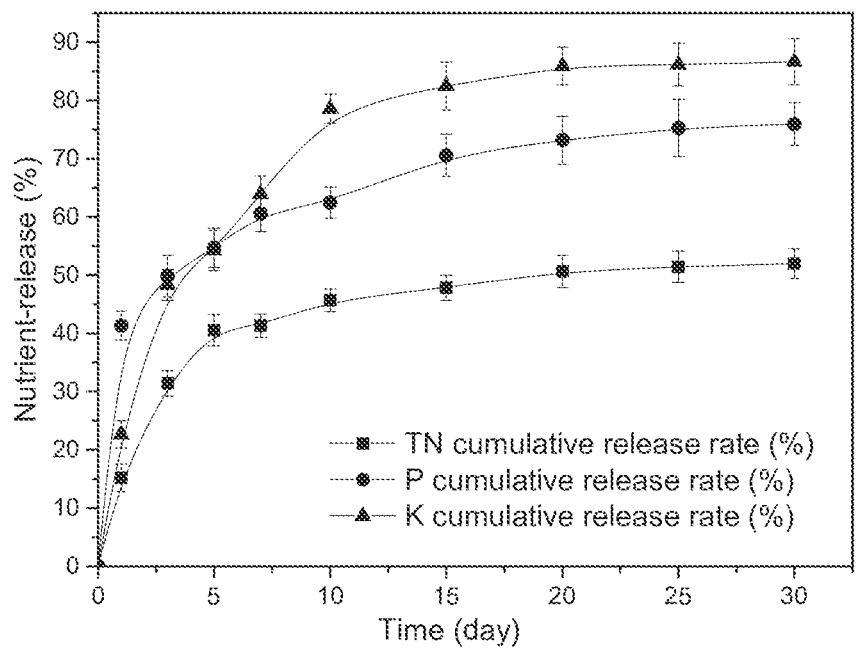
FIG. 7 shows the release curves of nitrogen, phosphorus and potassium as nutrients of cellulose-based water-absorbing and water-retaining multi-nutrient biodegradable polymeric slow/controlled release fertilizer having a semi-interpenetrating network structure prepared in Example 17. In the figure, the release of nitrogen, phosphorus and potassium as nutrients all exhibit a trend of rapidly increasing at an early stage and gradually becoming gentle at a later stage. At Day 30, the accumulative release rates of nitrogen, phosphorus and potassium were 51.9%, 75.9% and 86.6%, respectively. It can be seen that the cellulose-based water-absorbing and water-retaining multi-nutrient biodegradable polymeric slow/controlled release fertilizer having a semi-interpenetrating network structure has an excellent action in terms of slow/controlled release of nitrogen, phosphorus and potassium as nutrients.
Figure 8:
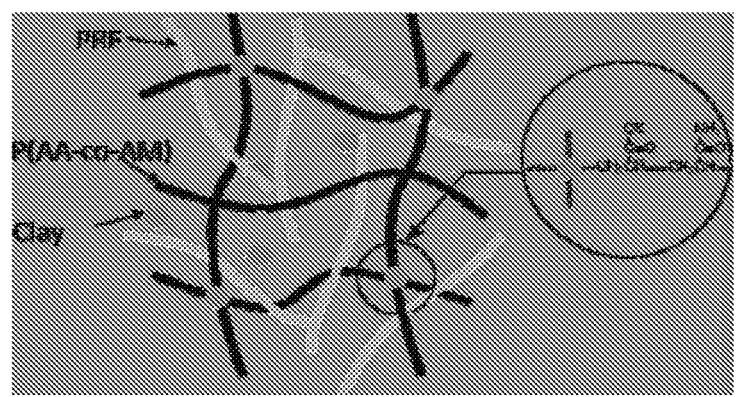
FIG. 8 is a structural schematic representation of one of the water-absorbing and water-retaining multi-nutrient biodegradable polymeric slow/controlled release fertilizers having a semi-interpenetrating network structure of the present invention. In the figure, P(AA-co-AM) refers to the copolymer, PRF refers to the polymeric slow/controlled release fertilizer, and clay refers to inorganic clay. It can be seen from the figure that part of the inorganic clay acts as graft cross-linking points for the copolymer and part of inorganic clay separates itself from water-absorbing resin.
Figure 9:
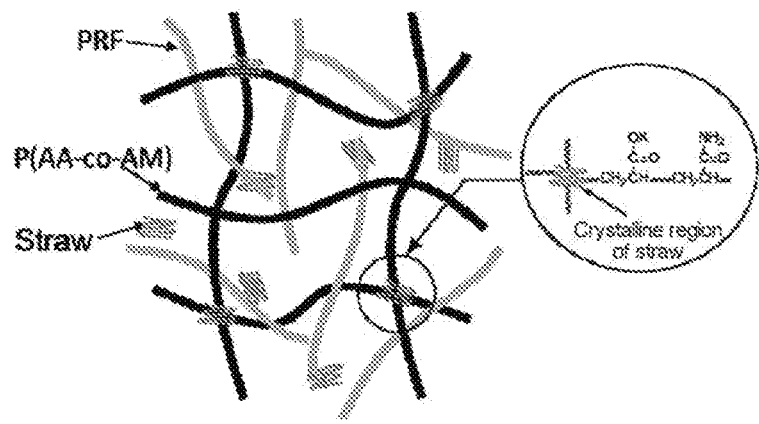
FIG. 9 is a structural schematic representation of one of the water-absorbing and water-retaining multi-nutrient biodegradable polymeric slow/controlled release fertilizers having a semi-interpenetrating network structure of the present invention. In the figure, P(AA-co-AM) refers to the copolymer, PRF refers to the polymeric slow/controlled release fertilizer, and straw refers to cellulose crystals in the treated crop straw. It can be seen from the figure that part of the cellulose crystals act as graft cross-linking points for the copolymer and part of cellulose crystals separate themselves from crop straw-based water-absorbing resin.
Figure 10:
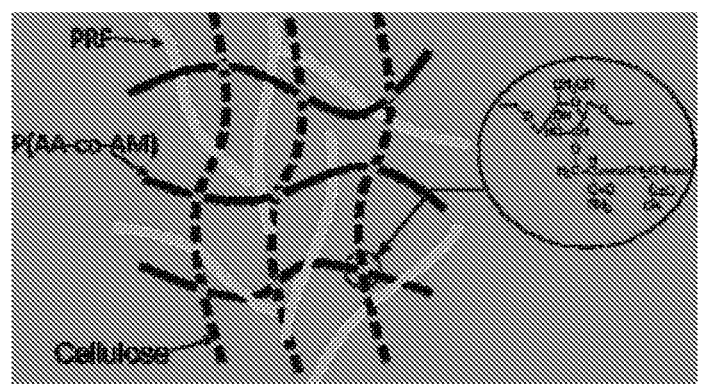
FIG. 10 is a structural schematic representation of the water-absorbing and water-retaining multi-nutrient biodegradable polymeric slow/controlled release fertilizer having a semi-interpenetrating network structure of the present invention. In the figure, P(AA-co-AM) refers to the copolymer, PRF refers to the polymeric slow/controlled release fertilizer, and cellulose refers to celluloses. It can be seen from the figure that celluloses act as graft cross-linking points for the copolymer.
Figure 11:
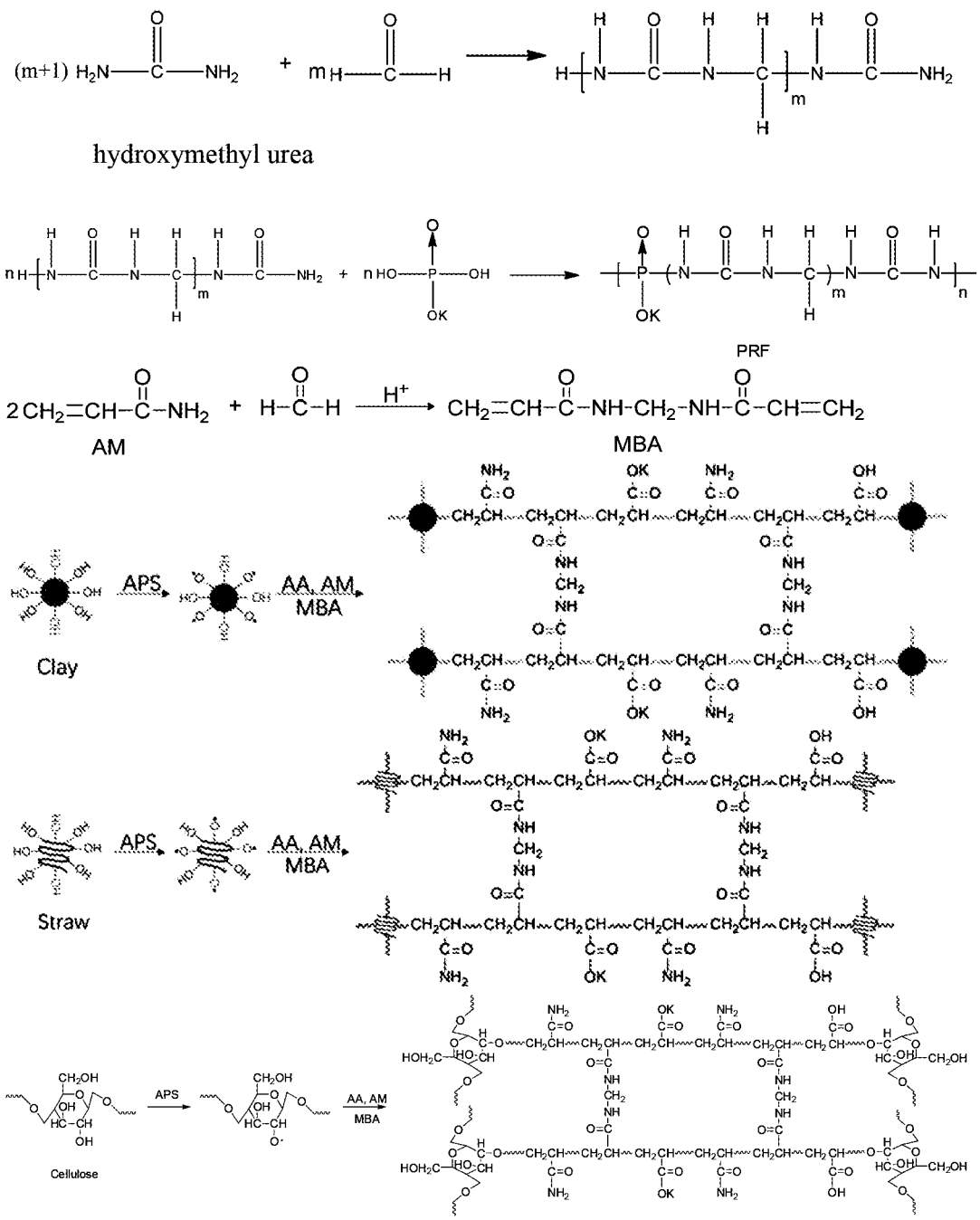
FIG. 11 is a series of diagrams of a semi-interpenetrating network structure encompassed by the disclosure.

The percentage concentration (%) not specifically stated throughout the specification refers to a mass fraction w/w (percentage by mass concentration).

A water-absorbing and water-retaining multi-nutrient biodegradable polymeric slow/controlled release fertilizer having a semi-interpenetrating network structure, comprising a high polymer having a semi-interpenetrating network structure, said semi-interpenetrating network structure of the high polymer being such that a polymeric slow/controlled release fertilizer (PRF) molecular chain is interposed in a composite water-absorbing resin network;

wherein said composite water-absorbing resin is of a three-dimensional spatial network structure formed by graft copolymerization of acrylic acid and acrylamide with inorganic clay, pretreated crop straw or cellulose backbone under the action of an initiator and a crosslinking agent.

In addition, said water-absorbing and water-retaining multi-nutrient biodegradable polymeric slow/controlled release fertilizer having a semi-interpenetrating network structure further comprises a polymeric slow/controlled release fertilizer (PRF) that separates itself from the composite water-absorbing resin three-dimensional spatial network structure and aggregates into a monophasic structure.

Further, said water-absorbing and water-retaining multi-nutrient biodegradable polymeric slow/controlled release fertilizer having a semi-interpenetrating network structure further comprises inorganic clay, pretreated crop straw or cellulose that separates itself from the composite water-absorbing resin three-dimensional spatial network structure.

The present invention provides a method for preparing a water-absorbing and water-retaining multi-nutrient biodegradable polymeric slow/controlled release fertilizer having a semi-interpenetrating network structure, comprising the steps of:

(1) adding formaldehyde and urea respectively into a first reactor, adjusting the resultant system to pH=8 with a 5% KOH solution, and reacting the same at 40° C. for 2 h to obtain a hydroxymethyl urea solution;

(2) adding acrylic acid and acrylamide into a second reactor, and adding a 20 mass % KOH solution to adjust the neutralization degree of acrylic acid monomer to 20% to 100%; adding one of inorganic clay, pretreated crop straw or cellulose; and then adding monopotassium phosphate, an initiator and the hydroxymethyl urea solution prepared in step (1) sequentially, mixing them under an ice bath for 30 min, warming the resultant mixture to 55° C. and then reacting the same under an atmosphere of nitrogen for 4 h to obtain a viscous product;

(3) granulating the obtained viscous product and oven drying the same to obtain a water-absorbing and water-retaining multi-nutrient biodegradable polymeric slow/controlled release fertilizer having a semi-interpenetrating network structure.

The above neutralization degree of acrylic acid monomer can be selected to be 20%, 40%, 60%, 80% or 100%. However, the neutralization degree is preferably 80% in view of the water absorption of the copolymer.

Preferably, the molar ratio of formaldehyde to urea is 1:1.2 to 2. For example, it can be selected to be 1:1.2, 1:1.5 or 1:2.

Preferably, in step (2), the mass ratio of acrylic acid to acrylamide to inorganic clay, pretreated crop straw or cellulose is (2 to 10):1:(0.2 to 1). For example, it can be selected to be 2:1:0.2, 2:1:1, 10:1:1, or 10:1:0.2.

Specifically, in step (2), said monopotassium phosphate, initiator and hydroxymethyl urea solution are added in an amount of 0 to 10%, 0.1% to 1% and 0 to 100% of the total mass of acrylic acid and acrylamide respectively, and the addition amount of neither monopotassium phosphate nor hydroxymethyl urea solution is 0. For example, monopotassium phosphate constitutes 0.1%, 1%, 5% or 10% of the total mass of acrylic acid and acrylamide; the initiator constitutes 0.1%, 0.55% or 1% of the total mass of acrylic acid and acrylamide; and hydroxymethyl urea solution constitutes 0.1%, 10%, 20%, 50% or 100% of the total mass of acrylic acid and acrylamide.

Specifically, said inorganic clay is any one of attapulgite, kaolin, diatomite, mica, bentonite, hydrotalcite, stilbite, illite and rectorite. Said crop straw is any one of wheat straw, rice straw, maize straw and sorghum straw. Said cellulose is any one of carboxymethyl cellulose, hydroxyethyl cellulose and cellulose xanthogenate.

In a specific embodiment, said initiator is any one of hydrogen peroxide, potassium persulfate, sodium persulfate, ammonium persulfate, ceric nitrate, a mixture of hydrogen peroxide and ferrous sulfate, a mixture of persulfate and sodium bisulfite, a mixture of persulfate and sodium sulfite, and L-ascorbic acid.

In order to illustrate the technical content of the present invention more clearly, the following specific Examples are provided.

Example 1

A method for preparing an inorganic clay-based water-absorbing and water-retaining multi-nutrient biodegradable polymeric slow/controlled release fertilizer having a semi-interpenetrating network structure, comprising the steps of:

(1) adding 4.06 g of formaldehyde and 6 g of urea respectively into a first reactor, adjusting the resultant system to pH=8 with a 5% KOH solution, and reacting the same at 40° C. for 2 h to obtain a hydroxymethyl urea solution;

(2) adding 5 g of acrylic acid, 2 g of acrylamide and 0.7 g of diatomite into a second reactor, and adding a 20 mass % KOH solution to adjust the neutralization degree of acrylic acid to 80%; and then adding 0.5 g of monopotassium phosphate, 0.021 g of ammonium persulfate and 12 g of the hydroxymethyl urea solution prepared in step (1), mixing them under an ice bath for 30 min, warming the resultant mixture to 55° C. and then reacting the same under an atmosphere of nitrogen for 4 h to obtain a viscous product; and (3) granulating the obtained viscous product and oven drying the same to obtain a diatomite-based water-absorbing and water-retaining multi-nutrient biodegradable polymeric slow/controlled release fertilizer having a semi-interpenetrating network structure.

In the resulting inorganic diatomite-based water-absorbing and water-retaining multi-nutrient biodegradable polymeric slow/controlled release fertilizer having a semi-interpenetrating network structure, the content of nitrogen is 35.74%, the content of phosphorus is 1.07% in terms of $P_2O_5$, the content of potassium is 10.22% in terms of $K_2O$; and the water absorbency in tap water is 86 g/g.

Example 2

A method for preparing an inorganic clay-based water-absorbing and water-retaining multi-nutrient biodegradable polymeric slow/controlled release fertilizer having a semi-interpenetrating network structure, comprising the steps of:

(1) adding 4.06 g of formaldehyde and 6 g of urea respectively into a first reactor, adjusting the resultant system to pH=8 with a 5% KOH solution, and reacting the same at 40° C. for 2 h to obtain a hydroxymethyl urea solution;

(2) adding 5 g of acrylic acid, 2 g of acrylamide and 0.7 g of attapulgite into a second reactor, and adding a 20 mass % KOH solution to adjust the neutralization degree of acrylic acid to 80%; and then adding 0.5 g of monopotassium phosphate, 0.021 g of ammonium persulfate and 12 g of the hydroxymethyl urea solution prepared in step (1), mixing them under an ice bath for 30 min, warming the resultant mixture to 55° C. and then reacting the same under an atmosphere of nitrogen for 4 h to obtain a viscous product; and (3) granulating the obtained viscous product and oven drying the same to obtain a attapulgite-based water-retaining multi-nutrient biodegradable polymeric slow/controlled release fertilizer having a semi-interpenetrating network structure.

In the resulting attapulgite-based water-absorbing and water-retaining multi-nutrient biodegradable polymeric slow/controlled release fertilizer having a semi-interpenetrating network structure, the content of nitrogen is 35.68%, the content of phosphorus is 1.17% in terms of $P_2O_5$, the content of potassium is 13.70% in terms of $K_2O$; and the water absorbency in tap water is 45 g/g.

Example 3

A method for preparing an inorganic clay-based water-absorbing and water-retaining multi-nutrient biodegradable polymeric slow/controlled release fertilizer having a semi-interpenetrating network structure, comprising the steps of:

(1) adding 4.06 g of formaldehyde and 6 g of urea respectively into a first reactor, adjusting the resultant system to pH=8 with a 5% KOH solution, and reacting the same at 40° C. for 2 h to obtain a hydroxymethyl urea solution;

(2) adding 5 g of acrylic acid, 2 g of acrylamide and 0.7 g of kaolin into a second reactor, and adding a 20 mass % KOH solution to adjust the neutralization degree of acrylic acid to 80%; and then adding 0.5 g of monopotassium phosphate, 0.021 g of ammonium persulfate and 12 g of the hydroxymethyl urea solution prepared in step (1), mixing them under an ice bath for 30 min, warming the resultant mixture to 55° C. and then reacting the same under an atmosphere of nitrogen for 4 h to obtain a viscous product; and (3) granulating the obtained viscous product and oven drying the same to obtain a kaolin-based water-absorbing and water-retaining multi-nutrient biodegradable polymeric slow/controlled release fertilizer having a semi-interpenetrating network structure.

In the resulting kaolin-based water-absorbing and water-retaining multi-nutrient biodegradable polymeric slow/controlled release fertilizer having a semi-interpenetrating network structure, the content of nitrogen is 34.81%, the content of phosphorus is 1.31% in terms of $P_2O_5$, the content of potassium is 11.32% in terms of $K_2O$; and the water absorbency in tap water is 70 g/g.

Example 4

A method for preparing an inorganic clay-based water-absorbing and water-retaining multi-nutrient biodegradable polymeric slow/controlled release fertilizer having a semi-interpenetrating network structure, comprising the steps of:

(1) adding 4.06 g of formaldehyde and 6 g of urea respectively into a first reactor, adjusting the resultant system to pH=8 with a 5% KOH solution, and reacting the same at 40° C. for 2 h to obtain a hydroxymethyl urea solution;

(2) adding 5 g of acrylic acid, 2 g of acrylamide and 0.7 g of mica into a second reactor, and adding a 20 mass % KOH solution to adjust the neutralization degree of acrylic acid to 80%; and then adding 0.5 g of monopotassium phosphate, 0.021 g of ammonium persulfate and 12 g of the hydroxymethyl urea solution prepared in step (1), mixing them under an ice bath for 30 min, warming the resultant mixture to 55° C. and then reacting the same under an atmosphere of nitrogen for 4 h to obtain a viscous product; and (3) granulating the obtained viscous product and oven drying the same to obtain a mica-based water-absorbing and water-retaining multi-nutrient biodegradable polymeric slow/controlled release fertilizer having a semi-interpenetrating network structure.

In the resulting mica-based water-absorbing and water-retaining multi-nutrient biodegradable polymeric slow/controlled release fertilizer having a semi-interpenetrating network structure, the content of nitrogen is 34.90%, the content of phosphorus is 0.76% in terms of $P_2O_5$, the content of potassium is 9.53% in terms of $K_2O$; and the water absorbency in tap water is 70 g/g.

Example 5

A method for preparing a clay-based water-absorbing and water-retaining multi-nutrient biodegradable polymeric slow/controlled release fertilizer having a semi-interpenetrating network structure, comprising the steps of:

(1) adding 4.06 g of formaldehyde and 6 g of urea respectively into a first reactor, adjusting the resultant system to pH=8 with a 5% KOH solution, and reacting the same at 40° C. for 2 h to obtain a hydroxymethyl urea solution;

(2) adding 5 g of acrylic acid, 2 g of acrylamide and 0.7 g of diatomite into a second reactor, and adding a 20 mass % KOH solution to adjust the neutralization degree of acrylic acid to 80%; and then adding 0.5 g of monopotassium phosphate, 0.021 g of ammonium persulfate and 12 g of the hydroxymethyl urea solution prepared in step (1), mixing them under an ice bath for 30 min, warming the resultant mixture to 55° C. and then reacting the same under an atmosphere of nitrogen for 4 h to obtain a viscous product; and (3) granulating the obtained viscous product and oven drying the same to obtain a montmorillonite-based water-absorbing and water-retaining multi-nutrient biodegradable polymeric slow/controlled release fertilizer having a semi-interpenetrating network structure.

In the resulting montmorillonite-based water-retaining multi-nutrient biodegradable polymeric slow/controlled release fertilizer having a semi-interpenetrating network structure, the content of nitrogen is 35.86%, the content of phosphorus is 0.96% in terms of $P_2O_5$, the content of potassium is 16.52% in terms of $K_2O$; and the water absorbency in tap water is 58 g/g.

Example 6

A method for preparing an inorganic clay-based water-absorbing and water-retaining multi-nutrient biodegradable polymeric slow/controlled release fertilizer having a semi-interpenetrating network structure, comprising the steps of:

(1) adding 4.06 g of formaldehyde and 6 g of urea respectively into a first reactor, adjusting the resultant system to pH=8 with a 5% KOH solution, and reacting the same at 40° C. for 2 h to obtain a hydroxymethyl urea solution;

(2) adding 5 g of acrylic acid, 2 g of acrylamide and 0.7 g of kaolin into a second reactor, and adding a 20 mass % KOH solution to adjust the neutralization degree of acrylic acid to 80%; and then adding 1 g of monopotassium phosphate, 0.021 g of ammonium persulfate and 12 g of the hydroxymethyl urea solution prepared in step (1), mixing them under an ice bath for 30 min, warming the resultant mixture to 55° C. and then reacting the same under an atmosphere of nitrogen for 4 h to obtain a viscous product; and (3) granulating the obtained viscous product and oven drying the same to obtain a kaolin-based water-absorbing and water-retaining multi-nutrient biodegradable polymeric slow/controlled release fertilizer having a semi-interpenetrating network structure.

In the resulting kaolin-based water-absorbing and water-retaining multi-nutrient biodegradable polymeric slow/controlled release fertilizer having a semi-interpenetrating network structure, the content of nitrogen is 29.73%, the content of phosphorus is 2.35% in terms of $P_2O_5$, the content of potassium is 18.52% in terms of $K_2O$; and the water absorbency in tap water is 39 g/g.

Example 7

A method for preparing an inorganic clay-based water-absorbing and water-retaining multi-nutrient biodegradable polymeric slow/controlled release fertilizer having a semi-interpenetrating network structure, comprising the steps of:

(1) adding 2.03 g of formaldehyde and 3 g of urea respectively into a first reactor, adjusting the resultant system to pH=8 with a 5% KOH solution, and reacting the same at 40° C. for 2 h to obtain a hydroxymethyl urea solution;

(2) adding 5 g of acrylic acid, 2 g of acrylamide and 0.7 g of kaolin into a second reactor, and adding a 20 mass % KOH solution to adjust the neutralization degree of acrylic acid to 80%; and then adding 0.5 g of monopotassium phosphate, 0.021 g of ammonium persulfate and 6 g of the hydroxymethyl urea solution prepared in step (1), mixing them under an ice bath for 30 min, warming the resultant mixture to 55° C. and then reacting the same under an atmosphere of nitrogen for 4 h to obtain a viscous product; and (3) granulating the obtained viscous product and oven drying the same to obtain a kaolin-based water-absorbing and water-retaining multi-nutrient biodegradable polymeric slow/controlled release fertilizer having a semi-interpenetrating network structure.

In the resulting kaolin-based water-absorbing and water-retaining multi-nutrient biodegradable polymeric slow/controlled release fertilizer having a semi-interpenetrating network structure, the content of nitrogen is 21.86%, the content of phosphorus is 1.94% in terms of $P_2O_5$, the content of potassium is 13.37% in terms of $K_2O$; and the water absorbency in tap water is 126 g/g.

Example 8

A method for preparing a crop straw-based water-absorbing and water-retaining multi-nutrient biodegradable polymeric slow/controlled release fertilizer having a semi-interpenetrating network structure, comprising the steps of:

(1) adding 6.70 g of formaldehyde and 6 g of urea respectively into a first reactor, adjusting the resultant system to pH=8 with a 5% KOH solution, and reacting the same at 40° C. for 2 h to obtain a hydroxymethyl urea solution;

(2) adding 5 g of acrylic acid, 2 g of acrylamide and 0.7 g of treated crop straw powder into a second reactor, and adding a 20 mass % KOH solution to adjust the neutralization degree of acrylic acid to 80%; and then adding 0.5 g of monopotassium phosphate, 0.021 g of ammonium persulfate and 12 g of the hydroxymethyl urea solution prepared in step (1), mixing them under an ice bath for 30 min, warming the resultant mixture to 55° C. and then reacting the same under an atmosphere of nitrogen for 4 h to obtain a viscous product; and (3) granulating the obtained viscous product and oven drying the same to obtain a crop straw-based water-absorbing and water-retaining multi-nutrient biodegradable polymeric slow/controlled release fertilizer having a semi-interpenetrating network structure.

In the resulting crop straw-based water-absorbing and water-retaining multi-nutrient biodegradable polymeric slow/controlled release fertilizer having a semi-interpenetrating network structure, the content of nitrogen is 29.30%, the content of phosphorus is 0.92% in terms of $P_2O_5$, the content of potassium is 11.76% in terms of $K_2O$; and the water absorbency in tap water is 26 g/g.

Example 9

A method for preparing a crop straw-based water-absorbing and water-retaining multi-nutrient biodegradable polymeric slow/controlled release fertilizer having a semi-interpenetrating network structure, comprising the steps of:

(1) adding 4.06 g of formaldehyde and 6 g of urea respectively into a first reactor, adjusting the resultant system to pH=8 with a 5% KOH solution, and reacting the same at 40° C. for 2 h to obtain a hydroxymethyl urea solution;

(2) adding 5.6 g of acrylic acid, 1.4 g of acrylamide and 0.7 g of treated crop straw powder into a second reactor, and adding a 20 mass % KOH solution to adjust the neutralization degree of acrylic acid to 80%; and then adding 0.5 g of monopotassium phosphate, 0.021 g of ammonium persulfate and 12 g of the hydroxymethyl urea solution prepared in step (1), mixing them under an ice bath for 30 min, warming the resultant mixture to 55° C. and then reacting the same under an atmosphere of nitrogen for 4 h to obtain a viscous product; and (3) granulating the obtained viscous product and oven drying the same to obtain a crop straw-based water-absorbing and water-retaining multi-nutrient biodegradable polymeric slow/controlled release fertilizer having a semi-interpenetrating network structure.

In the resulting crop straw-based water-absorbing and water-retaining multi-nutrient biodegradable polymeric slow/controlled release fertilizer having a semi-interpenetrating network structure, the content of nitrogen is 32.80%, the content of phosphorus is 0.98% in terms of $P_2O_5$, the content of potassium is 12.60% in terms of $K_2O$; and the water absorbency in tap water is 42 g/g.

Example 10

A method for preparing a crop straw-based water-absorbing and water-retaining multi-nutrient biodegradable polymeric slow/controlled release fertilizer having a semi-interpenetrating network structure, comprising the steps of:

(1) adding 4.06 g of formaldehyde and 6 g of urea respectively into a first reactor, adjusting the resultant system to pH=8 with a 5% KOH solution, and reacting the same at 40° C. for 2 h to obtain a hydroxymethyl urea solution;

(2) adding 5 g of acrylic acid, 2 g of acrylamide and 0.7 g of treated crop straw powder into a second reactor, and adding a 20 mass % KOH solution to adjust the neutralization degree of acrylic acid to 80%; and then adding 0.5 g of monopotassium phosphate, 0.021 g of ammonium persulfate and 12 g of the hydroxymethyl urea solution prepared in step (1), mixing them under an ice bath for 30 min, warming the resultant mixture to 55° C. and then reacting the same under an atmosphere of nitrogen for 4 h to obtain a viscous product; and (3) granulating the obtained viscous product and oven drying the same to obtain a crop straw-based water-absorbing and water-retaining multi-nutrient biodegradable polymeric slow/controlled release fertilizer having a semi-interpenetrating network structure.

In the resulting crop straw-based water-absorbing and water-retaining multi-nutrient biodegradable polymeric slow/controlled release fertilizer having a semi-interpenetrating network structure, the content of nitrogen is 33.20%, the content of phosphorus is 0.94% in terms of $P_2O_5$, the content of potassium is 13.62% in terms of $K_2O$; and the water absorbency in tap water is 46 g/g.

Example 11

A method for preparing a crop straw-based water-absorbing and water-retaining multi-nutrient biodegradable polymeric slow/controlled release fertilizer having a semi-interpenetrating network structure, comprising the steps of:

(1) adding 4.06 g of formaldehyde and 6 g of urea respectively into a first reactor, adjusting the resultant system to pH=8 with a 5% KOH solution, and reacting the same at 40° C. for 2 h to obtain a hydroxymethyl urea solution;

(2) adding 5 g of acrylic acid, 2 g of acrylamide and 1.4 g of treated crop straw powder into a second reactor, and adding a 20 mass % KOH solution to adjust the neutralization degree of acrylic acid to 80%; and then adding 0.5 g of monopotassium phosphate, 0.021 g of ammonium persulfate and 12 g of the hydroxymethyl urea solution prepared in step (1), mixing them under an ice bath for 30 min, warming the resultant mixture to 55° C. and then reacting the same under an atmosphere of nitrogen for 4 h to obtain a viscous product; and (3) granulating the obtained viscous product and oven drying the same to obtain a crop straw-based water-absorbing and water-retaining multi-nutrient biodegradable polymeric slow/controlled release fertilizer having a semi-interpenetrating network structure.

In the resulting crop straw-based water-absorbing and water-retaining multi-nutrient biodegradable polymeric slow/controlled release fertilizer having a semi-interpenetrating network structure, the content of nitrogen is 26.43%, the content of phosphorus is 0.82% in terms of $P_2O_5$, the content of potassium is 9.64% in terms of $K_2O$; and the water absorbency in tap water is 38 g/g.

Example 12

A method for preparing a crop straw-based water-absorbing and water-retaining multi-nutrient biodegradable polymeric slow/controlled release fertilizer having a semi-interpenetrating network structure, comprising the steps of:

(1) adding 4.06 g of formaldehyde and 6 g of urea respectively into a first reactor, adjusting the resultant system to pH=8 with a 5% KOH solution, and reacting the same at 40° C. for 2 h to obtain a hydroxymethyl urea solution;

(2) adding 5 g of acrylic acid, 2 g of acrylamide and 0.7 g of treated crop straw powder into a second reactor, and adding a 20 mass % KOH solution to adjust the neutralization degree of acrylic acid to 80%; and then adding 0.8 g of monopotassium phosphate, 0.021 g of ammonium persulfate and 12 g of the hydroxymethyl urea solution prepared in step (1), mixing them under an ice bath for 30 min, warming the resultant mixture to 55° C. and then reacting the same under an atmosphere of nitrogen for 4 h to obtain a viscous product; and (3) granulating the obtained viscous product and oven drying the same to obtain a crop straw-based water-absorbing and water-retaining multi-nutrient biodegradable polymeric slow/controlled release fertilizer having a semi-interpenetrating network structure.

In the resulting crop straw-based water-absorbing and water-retaining multi-nutrient biodegradable polymeric slow/controlled release fertilizer having a semi-interpenetrating network structure, the content of nitrogen is 30.65%, the content of phosphorus is 1.48% in terms of $P_2O_5$, the content of potassium is 16.32% in terms of $K_2O$; and the water absorbency in tap water is 34 g/g.

Example 13

A method for preparing a crop straw-based water-absorbing and water-retaining multi-nutrient biodegradable polymeric slow/controlled release fertilizer having a semi-interpenetrating network structure, comprising the steps of:

(1) adding 4.06 g of formaldehyde and 6 g of urea respectively into a first reactor, adjusting the resultant system to pH=8 with a 5% KOH solution, and reacting the same at 40° C. for 2 h to obtain a hydroxymethyl urea solution;

(2) adding 5 g of acrylic acid, 2 g of acrylamide and 0.7 g of treated crop straw powder into a second reactor, and adding a 20 mass % KOH solution to adjust the neutralization degree of acrylic acid to 80%; and then adding 1 g of monopotassium phosphate, 0.021 g of ammonium persulfate and 12 g of hydroxymethyl urea solution prepared in step (1), mixing them under an ice bath for 30 min, warming the resultant mixture to 55° C. and then reacting the same under an atmosphere of nitrogen for 4 h to obtain a viscous product; and (3) granulating the obtained viscous product and oven drying the same to obtain a crop straw-based water-absorbing and water-retaining multi-nutrient biodegradable polymeric slow/controlled release fertilizer having a semi-interpenetrating network structure.

In the resulting crop straw-based water-absorbing and water-retaining multi-nutrient biodegradable polymeric slow/controlled release fertilizer having a semi-interpenetrating network structure, the content of nitrogen is 30.19%, the content of phosphorus is 1.97% in terms of $P_2O_5$, the content of potassium is 19.83% in terms of $K_2O$; and the water absorbency in tap water is 27 g/g.

Example 14

A method for preparing a crop straw-based water-absorbing and water-retaining multi-nutrient biodegradable polymeric slow/controlled release fertilizer having a semi-interpenetrating network structure, comprising the steps of:

(1) adding 1.35 g of formaldehyde and 2 g of urea respectively into a first reactor, adjusting the resultant system to pH=8 with a 5% KOH solution, and reacting the same at 40° C. for 2 h to obtain a hydroxymethyl urea solution;

(2) adding 5 g of acrylic acid, 2 g of acrylamide and 0.7 g of treated crop straw powder into a second reactor, and adding a 20 mass % KOH solution to adjust the neutralization degree of acrylic acid to 80%; and then adding 0.5 g of monopotassium phosphate, 0.021 g of ammonium persulfate and 4 g of the hydroxymethyl urea solution prepared in step (1), mixing them under an ice bath for 30 min, warming the resultant mixture to 55° C. and then reacting the same under an atmosphere of nitrogen for 4 h to obtain a viscous product; and (3) granulating the obtained viscous product and oven drying the same to obtain a crop straw-based water-absorbing and water-retaining multi-nutrient biodegradable polymeric slow/controlled release fertilizer having a semi-interpenetrating network structure.

In the resulting crop straw-based water-absorbing and water-retaining multi-nutrient biodegradable polymeric slow/controlled release fertilizer having a semi-interpenetrating network structure, the content of nitrogen is 16.83%, the content of phosphorus is 1.50% in terms of $P_2O_5$, the content of potassium is 19.49% in terms of $K_2O$; and the water absorbency in tap water is 118 g/g.

Example 15

A method for preparing a cellulose-based water-absorbing and water-retaining multi-nutrient biodegradable polymeric slow/controlled release fertilizer having a semi-interpenetrating network structure, comprising the steps of:

(1) adding 4.06 g of formaldehyde and 6 g of urea respectively into a first reactor, adjusting the resultant system to pH=8 with a 5% KOH solution, and reacting the same at 40° C. for 2 h to obtain a hydroxymethyl urea solution;

(2) adding 5 g of acrylic acid, 2 g of acrylamide and 0.7 g of carboxymethyl cellulose powder into a second reactor, and adding a 20 mass % KOH solution to adjust the neutralization degree of acrylic acid to 80%; and then adding 0.5 g of monopotassium phosphate, 0.021 g of ammonium persulfate and 12 g of the hydroxymethyl urea solution prepared in step (1), mixing them under an ice bath for 30 min, warming the resultant mixture to 55° C. and then reacting the same under an atmosphere of nitrogen for 4 h to obtain a viscous product; and (3) granulating the obtained viscous product and oven drying the same to obtain a cellulose-based water-absorbing and water-retaining multi-nutrient biodegradable polymeric slow/controlled release fertilizer having a semi-interpenetrating network structure.

In the resulting cellulose-based water-absorbing and water-retaining multi-nutrient biodegradable polymeric slow/controlled release fertilizer having a semi-interpenetrating network structure, the content of nitrogen is 32.47%, the content of phosphorus is 0.96% in terms of $P_2O_5$, the content of potassium is 13.67% in terms of $K_2O$; and the water absorbency in tap water is 46 g/g.

Example 16

A method for preparing a cellulose-based water-absorbing and water-retaining multi-nutrient biodegradable polymeric slow/controlled release fertilizer having a semi-interpenetrating network structure, comprising the steps of:

(1) adding 4.06 g of formaldehyde and 6 g of urea respectively into a first reactor, adjusting the resultant system to pH=8 with a 5% KOH solution, and reacting the same at 40° C. for 2 h to obtain a hydroxymethyl urea solution;

(2) adding 5 g of acrylic acid, 2 g of acrylamide and 0.7 g of hydroxyethyl cellulose powder into a second reactor, and adding a 20 mass % KOH solution to adjust the neutralization degree of acrylic acid to 80%; and then adding 0.5 g of monopotassium phosphate, 0.021 g of ammonium persulfate and 12 g of the hydroxymethyl urea solution prepared in step (1), mixing them under an ice bath for 30 min, warming the resultant mixture to 55° C. and then reacting the same under an atmosphere of nitrogen for 4 h to obtain a viscous product; and (3) granulating the obtained viscous product and oven drying the same to obtain a cellulose-based water-absorbing and water-retaining multi-nutrient biodegradable polymeric slow/controlled release fertilizer having a semi-interpenetrating network structure.

In the resulting cellulose-based water-absorbing and water-retaining multi-nutrient biodegradable polymeric slow/controlled release fertilizer having a semi-interpenetrating network structure, the content of nitrogen is 31.96%, the content of phosphorus is 0.94% in terms of $P_2O_5$, the content of potassium is 13.47% in terms of $K_2O$; and the water absorbency in tap water is 62 g/g.

Example 17

A method for preparing a cellulose-based water-absorbing and water-retaining multi-nutrient biodegradable polymeric slow/controlled release fertilizer having a semi-interpenetrating network structure, comprising the steps of:

(1) adding 4.06 g of formaldehyde and 6 g of urea respectively into a first reactor, adjusting the resultant system to pH=8 with a 5% KOH solution, and reacting the same at 40° C. for 2 h to obtain a hydroxymethyl urea solution;

(2) adding 4.375 g of acrylic acid, 2.625 g of acrylamide and 0.7 g of hydroxyethyl cellulose powder into a second reactor, and adding a 20 mass % KOH solution to adjust the neutralization degree of acrylic acid to 80%; and then adding 0.5 g of monopotassium phosphate, 0.021 g of ammonium persulfate and 12 g of the hydroxymethyl urea solution prepared in step (1), mixing them under an ice bath for 30 min, warming the resultant mixture to 55° C. and then reacting the same under an atmosphere of nitrogen for 4 h to obtain a viscous product; and (3) granulating the obtained viscous product and oven drying the same to obtain a cellulose-based water-absorbing and water-retaining multi-nutrient biodegradable polymeric slow/controlled release fertilizer having a semi-interpenetrating network structure.

In the resulting cellulose-based water-absorbing and water-retaining multi-nutrient biodegradable polymeric slow/controlled release fertilizer having a semi-interpenetrating network structure, the content of nitrogen is 34.68%, the content of phosphorus is 0.89% in terms of $P_2O_5$, the content of potassium is 13.64% in terms of $K_2O$; and the water absorbency in tap water is 71 g/g.

Example 18

A method for preparing a cellulose-based water-absorbing and water-retaining multi-nutrient biodegradable polymeric slow/controlled release fertilizer having a semi-interpenetrating network structure, comprising the steps of:

(1) adding 4.06 g of formaldehyde and 6 g of urea respectively into a first reactor, adjusting the resultant system to pH=8 with a 5% KOH solution, and reacting the same at 40° C. for 2 h to obtain a hydroxymethyl urea solution;

(2) adding 4.375 g of acrylic acid, 2.625 g of acrylamide and 0.7 g of carboxymethyl cellulose powder into a second reactor, and adding a 20 mass % KOH solution to adjust the neutralization degree of acrylic acid to 80%; and then adding 0.5 g of monopotassium phosphate, 0.021 g of ammonium persulfate and 12 g of the hydroxymethyl urea solution prepared in step (1), mixing them under an ice bath for 30 min, warming the resultant mixture to 55° C. and then reacting the same under an atmosphere of nitrogen for 4 h to obtain a viscous product; and (3) granulating the obtained viscous product and oven drying the same to obtain a cellulose-based water-absorbing and water-retaining multi-nutrient biodegradable polymeric slow/controlled release fertilizer having a semi-interpenetrating network structure.

In the resulting cellulose-based water-absorbing and water-retaining multi-nutrient biodegradable polymeric slow/controlled release fertilizer having a semi-interpenetrating network structure, the content of nitrogen is 33.84%, the content of phosphorus is 0.85% in terms of $P_2O_5$, the content of potassium is 12.86% in terms of $K_2O$; and the water absorbency in tap water is 56 g/g.

Example 19

A method for preparing a cellulose-based water-absorbing and water-retaining multi-nutrient biodegradable polymeric slow/controlled release fertilizer having a semi-interpenetrating network structure, comprising the steps of:

(1) adding 4.06 g of formaldehyde and 6 g of urea respectively into a first reactor, adjusting the resultant system to pH=8 with a 5% KOH solution, and reacting the same at 40° C. for 2 h to obtain a hydroxymethyl urea solution;

(2) adding 4.375 g of acrylic acid, 2.625 g of acrylamide and 0.7 g of hydroxyethyl cellulose powder into a second reactor, and adding a 20 mass % KOH solution to adjust the neutralization degree of acrylic acid to 80%; and then adding 1 g of monopotassium phosphate, 0.021 g of ammonium persulfate and 12 g of the hydroxymethyl urea solution prepared in step (1), mixing them under an ice bath for 30 min, warming the resultant mixture to 55° C. and then reacting the same under an atmosphere of nitrogen for 4 h to obtain a viscous product; and (3) granulating the obtained viscous product and oven drying the same to obtain a cellulose-based water-absorbing and water-retaining multi-nutrient biodegradable polymeric slow/controlled release fertilizer having a semi-interpenetrating network structure.

In the resulting cellulose-based water-absorbing and water-retaining multi-nutrient biodegradable polymeric slow/controlled release fertilizer having a semi-interpenetrating network structure, the content of nitrogen is 30.65%, the content of phosphorus is 1.83% in terms of $P_2O_5$, the content of potassium is 18.47% in terms of $K_2O$; and the water absorbency in tap water is 35 g/g.

Example 20

A method for preparing a cellulose-based water-absorbing and water-retaining multi-nutrient biodegradable polymeric slow/controlled release fertilizer having a semi-interpenetrating network structure, comprising the steps of:

(1) adding 4.06 g of formaldehyde and 6 g of urea respectively into a first reactor, adjusting the resultant system to pH=8 with a 5% KOH solution, and reacting the same at 40° C. for 2 h to obtain a hydroxymethyl urea solution;

(2) adding 5 g of acrylic acid, 2 g of acrylamide and 0.35 g of hydroxyethyl cellulose powder into a second reactor, and adding a 20 mass % KOH solution to adjust the neutralization degree of acrylic acid to 80%; and then adding 0.5 g of monopotassium phosphate, 0.021 g of ammonium persulfate and 12 g of the hydroxymethyl urea solution prepared in step (1), mixing them under an ice bath for 30 min, warming the resultant mixture to 55° C. and then reacting the same under an atmosphere of nitrogen for 4 h to obtain a viscous product; and (3) granulating the obtained viscous product and oven drying the same to obtain a cellulose-based water-absorbing and water-retaining multi-nutrient biodegradable polymeric slow/controlled release fertilizer having a semi-interpenetrating network structure.

In the resulting cellulose-based water-absorbing and water-retaining multi-nutrient biodegradable polymeric slow/controlled release fertilizer having a semi-interpenetrating network structure, the content of nitrogen is 35.31%, the content of phosphorus is 1.08% in terms of $P_2O_5$, the content of potassium is 14.67% in terms of $K_2O$; and the water absorbency in tap water is 54 g/g.

Example 21

A method for preparing a cellulose-based water-absorbing and water-retaining multi-nutrient biodegradable polymeric slow/controlled release fertilizer having a semi-interpenetrating network structure, comprising the steps of:

(1) adding 2.03 g of formaldehyde and 3 g of urea respectively into a first reactor, adjusting the resultant system to pH=8 with a 5% KOH solution, and reacting the same at 40° C. for 2 h to obtain a hydroxymethyl urea solution;

(2) adding 4.375 g of acrylic acid, 2.625 g of acrylamide and 0.7 g of hydroxyethyl cellulose powder into a second reactor, and adding a 20 mass % KOH solution to adjust the neutralization degree of acrylic acid to 80%; and then adding 0.5 g of monopotassium phosphate, 0.021 g of ammonium persulfate and 6 g of the hydroxymethyl urea solution prepared in step (1), mixing them under an ice bath for 30 min, warming the resultant mixture to 55° C. and then reacting the same under an atmosphere of nitrogen for 4 h to obtain a viscous product; and (3) granulating the obtained viscous product and oven drying the same to obtain a cellulose-based water-absorbing and water-retaining multi-nutrient biodegradable polymeric slow/controlled release fertilizer having a semi-interpenetrating network structure.

In the resulting cellulose-based water-absorbing and water-retaining multi-nutrient biodegradable polymeric slow/controlled release fertilizer having a semi-interpenetrating network structure, the content of nitrogen is 24.73%, the content of phosphorus is 1.95% in terms of $P_2O_5$, the content of potassium is 15.82% in terms of $K_2O$; and the water absorbency in tap water is 134 g/g.

While illustrative embodiments have been illustrated and described, it will be appreciated that various changes can be made therein without departing from the spirit and scope of the invention.

The embodiments of the invention in which an exclusive property or privilege is claimed are defined as follows:

1. A water-absorbing and water-retaining multi-nutrient biodegradable polymeric slow/controlled release fertilizer having a semi-interpenetrating network structure, wherein the fertilizer comprises a high polymer having a semi-interpenetrating network structure, said semi-interpenetrating network structure of the high polymer being such that a polymeric slow/controlled release fertilizer (PRF) molecular chain is interposed in a composite water-absorbing resin network;

wherein said composite water-absorbing resin is of a three-dimensional spatial network structure formed by graft copolymerization of acrylic acid and acrylamide with inorganic clay or pretreated crop straw or cellulose under the action of an initiator and a crosslinking agent, wherein the PRF is the reaction product of hydroxymethyl urea and monopotassium phosphate, and wherein the semi-interpenetrating network structure is formed through simultaneous preparation of the composite water-absorbing resin and PRF in one reaction system.

2. The water-absorbing and water-retaining multi-nutrient biodegradable polymeric slow/controlled release fertilizer having a semi-interpenetrating network structure according to claim 1, wherein the fertilizer further comprises a polymeric slow/controlled release fertilizer (PRF) as the reaction product of hydroxymethyl urea and monopotassium phosphate that separates itself from the composite water-absorbing resin three-dimensional spatial network structure and aggregates into a monophasic structure.

3. A method for preparing a water-absorbing and water-retaining multi-nutrient biodegradable polymeric slow/controlled release fertilizer having a semi-interpenetrating network structure, wherein said method comprises the steps of:

(1) adding formaldehyde and urea respectively into a first reactor, adjusting the resultant system to pH=8 with a 5% KOH solution, and reacting the same at 40° C. for 2 h to obtain a hydroxymethyl urea solution;

(2) adding acrylic acid and acrylamide into a second reactor, and adding a 20 mass % KOH solution to adjust the neutralization degree of acrylic acid monomer to 20%-100%; adding inorganic clay, pretreated crop straw or cellulose; and then adding monopotassium phosphate, an initiator and the hydroxymethyl urea solution prepared in step (1) sequentially, mixing them under an ice bath for 30 min, warming the resultant mixture to 55° C. and then reacting the same under an atmosphere of nitrogen for 4 h to obtain a viscous product; and (3) granulating the obtained viscous product and oven drying the same to obtain a water-absorbing and water-retaining multi-nutrient biodegradable polymeric slow/controlled release fertilizer having a semi-interpenetrating network structure.

4. The method for preparing a water-absorbing and water-retaining multi-nutrient biodegradable polymeric slow/controlled release fertilizer having a semi-interpenetrating network structure according to claim 3, wherein the molar ratio of formaldehyde to urea is 1:1.2-2.

5. The method for preparing a water-absorbing and water-retaining multi-nutrient biodegradable polymeric slow/controlled release fertilizer having a semi-interpenetrating network structure according to claim 3, wherein the pretreatment of said crop straw comprises the steps of: weighing an amount of crop straw powder, immersing it in distilled water, soaking it at 60° C. for 12 h to produce a crop straw powder suspension, and then filtering the crop straw powder suspension to obtain a crop straw powder filter cake, placing the filter cake into a solution consisting of 24% KOH and 1% $NaBH_4$, stirring the same for 3 h to produce a second crop straw powder suspension, and then filtering the second crop straw powder suspension to obtain a second crop straw powder filter cake, then washing the second crop straw powder filter cake with distilled water repeatedly until the filtrate is neutral to produce a washed crop straw powder filter cake, and oven drying the washed crop straw powder filter cake to obtain a pretreated crop straw.

6. The method for preparing a water-absorbing and water-retaining multi-nutrient biodegradable polymeric slow/controlled release fertilizer having a semi-interpenetrating network structure according to claim 3, wherein the mass ratio of acrylic acid to acrylamide to inorganic clay in step (2) is (2-10):1:(0.2-1).

7. The method for preparing a water-absorbing and water-retaining multi-nutrient biodegradable polymeric slow/controlled release fertilizer having a semi-interpenetrating network structure according to claim 3, wherein in step (2), said monopotassium phosphate, initiator and hydroxymethyl urea solution are added in an amount of 0-10%, 0.1%-1% and 0-100% of the total mass of acrylic acid and acrylamide respectively, and the addition amount of neither monopotassium phosphate nor hydroxymethyl urea solution is 0.

8. The method for preparing a water-absorbing and water-retaining multi-nutrient biodegradable polymeric slow/controlled release fertilizer having a semi-interpenetrating network structure according to claim 3, wherein said inorganic clay is attapulgite, kaolin, diatomite, mica, bentonite, hydrotalcite, stilbite, illite or rectorite; said crop straw is wheat straw, rice straw, maize straw or sorghum straw; and said cellulose is carboxymethyl cellulose, hydroxyethyl cellulose or cellulose xanthogenate.

9. The method for preparing a water-absorbing and water-retaining multi-nutrient biodegradable polymeric slow/controlled release fertilizer having a semi-interpenetrating network structure according to claim 3, wherein said initiator is hydrogen peroxide, potassium persulfate, sodium persulfate, ammonium persulfate, ceric nitrate, a mixture of hydrogen peroxide and ferrous sulfate, a mixture of persulfate and sodium bisulfite, a mixture of persulfate and sodium sulfite, or L-ascorbic acid.

10. The method for preparing a water-absorbing and water-retaining multi-nutrient biodegradable polymeric slow/controlled release fertilizer having a semi-interpenetrating network structure according to claim 3, wherein the mass ratio of acrylic acid to acrylamide to pretreated crop straw in step (2) is (2-10):1:(0.2-1).

11. The method for preparing a water-absorbing and water-retaining multi-nutrient biodegradable polymeric slow/controlled release fertilizer having a semi-interpenetrating network structure according to claim 3, wherein the mass ratio of acrylic acid to acrylamide to cellulose in step (2) is (2-10):1:(0.2-1).

* * * * *

UNITED STATES PATENT AND TRADEMARK OFFICE
CERTIFICATE OF CORRECTION

PATENT NO. : 10,865,161 B2
APPLICATION NO. : 15/910887
DATED : December 15, 2020
INVENTOR(S) : Y. Liu et al.

It is certified that error appears in the above-identified patent and that said Letters Patent is hereby corrected as shown below:

On the Title Page

| Column | Line | |
|---|---|---|
| Item (57) | 6 | delete "method can comprises" and insert -- method comprises -- |

Signed and Sealed this
Sixteenth Day of August, 2022

Katherine Kelly Vidal
*Director of the United States Patent and Trademark Office*